(12) United States Patent
Veenstra et al.

(10) Patent No.: US 8,573,527 B2
(45) Date of Patent: Nov. 5, 2013

(54) PAYING OUT AND RETRACTING AN ELECTRIC POWER CORD

(75) Inventors: Auke-Jan Veenstra, Drachten (NL); Henricus Wilhelmus Johannes Baltussen, Westervoort (NL)

(73) Assignee: Kkoninklijke Philips N.V., Eindhoven (NL)

( * ) Notice: Subject to any disclaimer, the term of this patent is extended or adjusted under 35 U.S.C. 154(b) by 309 days.

(21) Appl. No.: 13/056,723

(22) PCT Filed: Jul. 29, 2009

(86) PCT No.: PCT/IB2009/053293
§ 371 (c)(1),
(2), (4) Date: Jan. 31, 2011

(87) PCT Pub. No.: WO2010/015966
PCT Pub. Date: Feb. 11, 2010

(65) Prior Publication Data
US 2011/0133013 A1 Jun. 9, 2011

(30) Foreign Application Priority Data
Aug. 5, 2008 (EP) .................................... 08161794

(51) Int. Cl.
*B65H 75/48* (2006.01)
(52) U.S. Cl.
USPC .................................. 242/390.2; 242/360.9

(58) Field of Classification Search
USPC ........ 242/389, 390, 390.2, 390.8, 390.9, 394, 242/394.1, 418, 418.1, 564.3, 564.4
See application file for complete search history.

(56) References Cited

U.S. PATENT DOCUMENTS

| 3,825,197 A | 7/1974 | Sturgeon et al. |
| 4,655,399 A * | 4/1987 | Harvey .......................... 239/745 |
| 4,736,826 A | 4/1988 | White et al. |
| 7,331,436 B1 | 2/2008 | Pack et al. |

FOREIGN PATENT DOCUMENTS

| GB | 2388527 A | 11/2003 |
| JP | 07171079 A * | 7/1995 |

OTHER PUBLICATIONS

Machine Translation of JP 07-171079 A.*

* cited by examiner

*Primary Examiner* — William E Dondero

(57) ABSTRACT

A device for paying out and retracting an electric power cord (4) comprising two driven cord winder members, the first member being a cord winding reel (1) and the second member being a drive element (7, 8) for engaging the cord (4) at a distance from the reel (1). An electric motor (20) can drive one of the two cord winder members in two directions and is connected with driving force to the other cord winder member (7, 8) by way of a slipper clutch (13) and a one-way clutch (12).

10 Claims, 3 Drawing Sheets

PAYING OUT AND RETRACTING AN ELECTRIC POWER CORD

FIELD OF THE INVENTION

The invention relates to a device for paying out and retracting an electric power cord, comprising an electric motor and two driven cord winder members, the first member being a cord winding reel and the second member being a drive element for engaging the cord at a distance from the reel, wherein the motor can drive one of the two cord winder members in two directions.

BACKGROUND OF THE INVENTION

Such a device is disclosed in U.S. Pat. No. 4,736,826. This publication describes a mobile robot remotely powered through an electric cord from a stationary console. The robot carries a cord managing arrangement which stores the cord and pays out or retracts the cord as needed. The arrangement lays down the cord under zero tension when the robot is outbound and reels it in as the robot returns. Thereby, the robot can follow a tortuous path without entangling the cord under or around obstacles. The cord is stored on the cord winding reel and is engaged by the drive element, which is a rotating sheave having a groove. The cord is pressed into the groove by a rotating member, so that friction between the cord and the sheave is generated. A first electric motor drives the sheave in order to pay out the cord, whereby the cord is unwound from the reel. As a result, the reel is driven by a second electric motor in a cooperative manner in order to facilitate an appropriate supply of cord to the rotating sheave. When retracting the cord, the second motor drives the reel such that the cord is stored on the reel, while said first motor drives the rotating sheave in a cooperative manner so that the cord is gathered into a tight bundle on the reel.

Such a cord paying out and retracting device can be used for many purposes, for example for paying out and retracting the electric power cord of a robotic vacuum cleaner when the vacuum cleaner is traveling during its cleaning action. It is required for the cord to be paid out and retracted along with the traveling speed of the vacuum cleaner in a controlled manner. The traveling speed of the vacuum cleaner can be measured or calculated, and the paying out or retracting speed of the cord can be adapted to this speed by control means.

SUMMARY OF THE INVENTION

The device for paying out and retracting the cord according to U.S. Pat. No. 4,736,826 is comparatively complicated, in particular owing to the presence of two electric motors for driving the cord winding reel and for driving the cord drive element, respectively, and owing to the presence of control means for controlling the speeds of both motors independently of each other.

It is an object of the invention to provide a device for paying out and retracting an electric power cord that comprises a cord winding reel and a drive element for engaging the cord at a distance from the reel wherein one electric motor drives the cord winding reel as well as the drive element in a convenient manner.

In order to achieve this object, the motor is not only connected with driving force to one of the cord winder members, but also to the other cord winder member through a slipper clutch and a one-way clutch, so that said other cord winder member can be driven by the motor in one direction through the slipper clutch, while said other cord winder member is free to move in the opposite direction at a speed lower than the driving speed caused by the motor.

A slipper clutch is a familiar device. It provides a transmission of a predetermined torque when the slipper clutch is driven at a higher rotational speed than the rotational speed of the output of the slipper clutch. Such a slipper clutch is known, for example, under the trade name "Ogura" as a PHT Permanent-Magnetic Hysteresis Clutch. A one-way clutch is also a familiar device. It can transmit a torque when it is driven in one rotational direction, the rotational output speed then being equal to the rotational input speed, but no rotating movement is transmitted when the one-way clutch is driven in the other rotational direction.

According to the invention, one of the two cord winder members (the reel or the drive element) is driven by the motor at a speed proportional to the speed of the motor, and the speed of that one member determines the displacement speed of the cord (i.e. the cord paying out speed or cord retraction speed). The other cord winder member is driven by the motor through the slipper clutch and the one-way clutch. In fact, the speed of said other cord winder member is determined by the speed of the cord, for which the cord between the two cord winder members has to be kept under a certain tension. Therefore, when the cord is moving towards said other cord winder member, that other member is driven at such a high speed that the slipper clutch slips, and the cord is pulled towards the member with a certain force. When the cord is moving away from said other cord winder member, that member is driven in the other direction at such a high speed that the one-way clutch allows a lower speed which corresponds to the displacement speed of the cord.

When the cord winding reel (said first cord winder member) is driven by the motor through the slipper clutch and the one-way clutch, the driving member (said second cord winder member) is driven by the motor at a speed proportional to the rotational speed of the motor. The speed of the driving member thus determines the displacement speed of the cord. When the cord is refracted, the driving member moves the cord in the direction of the reel, and the reel is driven by the motor through the slipper clutch at a relatively high speed, so that the slipper clutch is slipping while the cord is wound onto the reel. When the motor drives the driving member in the other direction, the cord is pulled by the driving member from the reel, during which the one-way clutch enables the reel to perform the required rotation. The motor accordingly drives the input of the one-way clutch at a relatively high speed, and the one-way clutch allows a free rotation of the reel at a lower speed.

In a preferred embodiment, the motor is connected with driving force to the drive element (said second cord winder member) via the slipper clutch for driving the drive element in the cord paying out direction, the ratio of the rotational speed of the reel to the rotational speed driving the slipper clutch (i.e. the input speed of the slipper clutch) being such that the slipper clutch is always slipping during unwinding of the cord from the reel. The one-way clutch is present in the connection between the motor and the drive element, so that the drive element (and thus the cord) is free to move in the retraction direction more slowly than the driving speed caused by the motor.

When being retracted the cord may be blocked, or it may be necessary to retract the cord temporarily with a relative high force for some reason. Such a temporary higher pulling force can be provided by the cord winding reel. Said higher force may give problems if the cord drive element is the member that determines the cord replacement speed. Therefore, it is preferred that the cord drive element is the cord winder member that is driven through the slipper clutch and the one-way clutch.

Preferably, the drive element comprises a drive wheel for engaging the cord and a freely rotating support wheel for pushing the cord against the drive wheel. The drive wheel may have a circumferential groove such that the support wheel pushes the cord into the groove so as to engage the cord firmly without slippage.

It may be required that the drive element exerts a certain force on the cord when the cord is retracted by the reel. Therefore, in a preferred embodiment, adjustable means are present for pressing the support wheel against the drive wheel, so that the resistance of the drive element can be varied.

In a preferred embodiment, the motor drives the cord winding reel through a gear train comprising at least three consecutive gears, while the motor is connected to the fastest rotating gear, the cord winding reel is connected to the slowest rotating gear, and the drive element is connected to a gear in between. A compact structure for driving both cord winder members by the electric motor can thus be obtained, as will be elucidated in a description of an embodiment of the invention.

When the device is incorporated in a mobile apparatus, such as a robotic vacuum cleaner, the cord has to be paid out and retracted in a controlled manner. The travelling path of the mobile apparatus can be measured and/or calculated in that the movement of the wheels of the apparatus is sensed and/or the surroundings of the apparatus are observed by a camera or the like. The paying out or retracting speed of the cord can thus be controlled in that the rotational speed of the electric motor is controlled. In a preferred embodiment of the invention, a sensor is present for measuring the paying out speed and the retraction speed of the cord, so that the desired cord displacement speed can be compared with the instantaneous displacement speed, and the motor can be controlled on the basis of the difference between these two speeds.

The sensor may detect signs on the cord in order to determine its displacement speed, but in a preferred embodiment the sensor comprises a speed detection wheel that is pressed against the cord. No special signs on the cord itself are then required, which signs may indeed disappear after frequent use of the apparatus.

The invention also relates to a method of paying out and retracting an electric power cord whereby the cord is paid out and retracted by a device comprising an electric motor and two driven cord winder members, the first member being a cord winding reel and the second member being a drive element engaging the cord at a distance from the reel, wherein the motor drives one of the two cord winder members, and wherein the motor drives the other cord winder member through a slipper clutch and a one-way clutch, so that said other cord winder member can be driven by the motor in one direction through the slipper clutch, while said other cord winder member is free to move in the opposite direction at a speed lower than the driving speed caused by the motor.

BRIEF DESCRIPTION OF THE DRAWING

The invention will now be further elucidated by means of a description of an embodiment of a device for paying out and retracting an electric power cord, comprising a cord winding reel and a drive element, both driven by the same electric motor, wherein the drive element is driven through a slipper clutch and a one-way clutch, with reference to the drawing comprising diagrammatical Figures, wherein.

The Figures are schematic representations, only showing parts that contribute to the elucidation of the described embodiment.

DETAILED DESCRIPTION OF EMBODIMENTS

Figure 1:
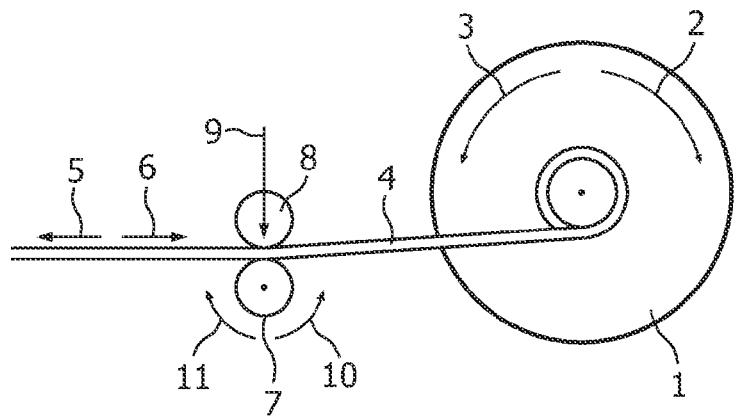
FIG. 1 diagrammatically shows the operation of the device.

FIG. 1 shows a cord winding reel 1 that is driven by an electric motor (not shown) in the cord paying out direction (arrow 2) or in the cord retraction direction (arrow 3), such that the electric power cord 4 is unwinding or winding on the reel 1, respectively. Arrow 5 and arrow 6 indicate the displacement of the cord 4 in the paying out direction and in the retraction direction, respectively. A drive element 7, 8 is present for engaging the cord 4 at some distance from the reel 1. The drive element comprises a drive wheel 7 and a support wheel 8, the support wheel 8 pressing the cord 1 against the rotating surface of the drive wheel 7, as is indicated with arrow 9, so that there is no slip between the cord 4 and the drive wheel 7.

When the electric motor drives the reel 1 in the paying out direction (arrow 2), the cord 4 has to be pulled away from the cord winding reel 1 by the drive element 7, 8. In order to exert a predetermined pulling force on the cord 4, the drive element 7, 8 comprises a slipper clutch (not shown) for driving the drive wheel 7. The rotational input speed of the drive element 7, 8 in the paying out direction (arrow 10) is thus higher than the rotational speed of the drive wheel 7 caused by the displacement of the cord 4, so that the slipper clutch slips while transmitting a predetermined torque. The transmitted torque causes a predetermined pulling force exerted by the drive element 7, 8 on the cord 4.

When the cord 4 is retracted, the electric motor drives the cord winding reel 1 in the retraction direction (arrow 3), during which the cord 4 has to be able to pass the drive element 7, 8 without too much resistance. For this purpose the drive element 7, 8 comprises a one-way clutch in the drive line from the motor to the drive wheel 7, which one-way clutch allows a free rotation of the drive wheel 7 in the paying out direction (arrow 10) when the input speed of the drive element 7, 8 is zero. When the cord 4 is refracted, however, the input speed of the drive element 7, 8 in the retraction direction (arrow 11) is relatively high, which high speed is required for obtaining a slipping of the slipper clutch in an opposite direction while paying out the cord 4. The drive wheel 7 is thus free to rotate in the retraction direction with a slower speed owing to the relatively high input speed of the drive element 7, 8 in the retraction direction. The pressing force of the support wheel 8 (indicated with arrow 9) can be varied in order to adjust a low resistance of the drive element 7, 8.

In an alternative embodiment of the device, the cord drive element 7, 8 is driven by the motor without the slipper clutch and the one-way clutch, so that the displacement speed of the cord 4 is determined by the rotational speed of the drive wheel 7. The cord winding reel 1 is thus driven via the slipper clutch and the one-way clutch, so that the reel 1 is driven through the slipping slipper clutch in the retraction direction (arrow 3), whereas in the paying out direction (arrow 2) the reel 1 is free to rotate more slowly than the drive speed caused by the motor because of the presence of the one-way clutch. In this alternative embodiment, the drive speed transmitted to the cord winding reel 1 by the motor has to be high enough always to cause—when retracting the cord 4—a slippage of the slipper clutch, in particular when the cord 4 is completely unwound from the reel 1.

Figure 2:
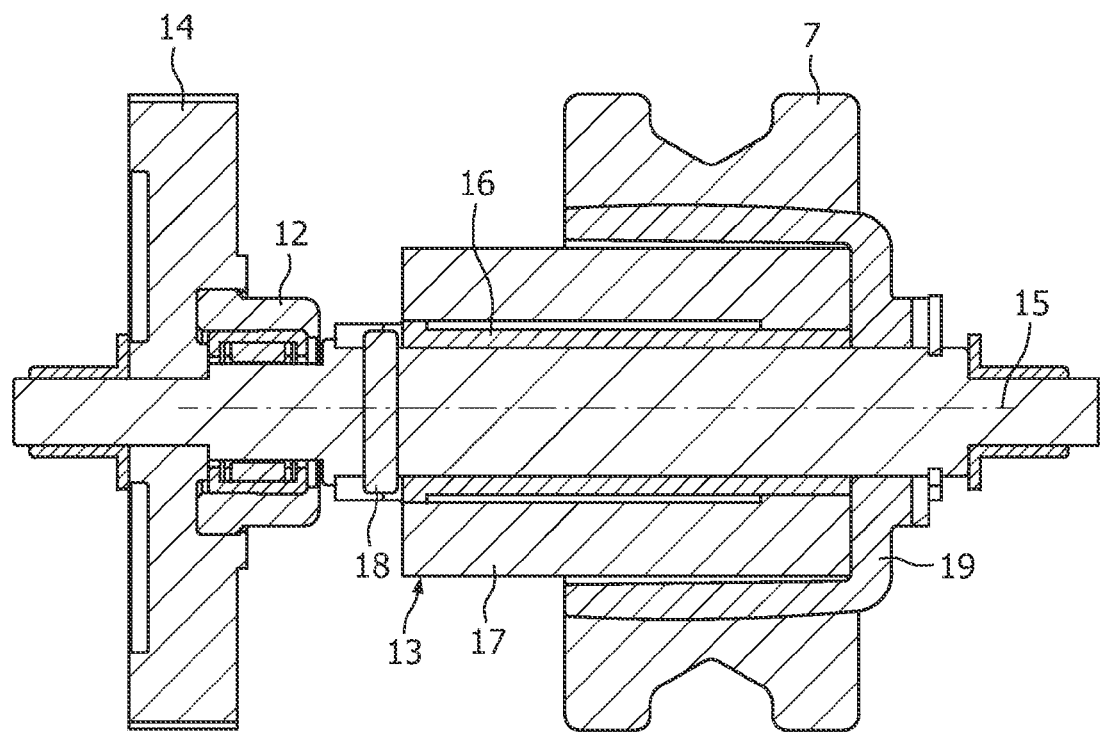
FIG. 2 is a sectional view of the drive of the drive wheel.

FIG. 2 is a sectional view of the one-way clutch 12 and the slipper clutch 13 for driving the cord drive wheel 7. A gear 14 is driven by the electric motor and is supported on the left end of the central shaft 15 so as to be freely rotating. Gear 14 is connected to the shaft 15 by means of the one-way clutch 12, so that gear 14 is free to rotate about the shaft 15 in a first direction, but it cannot rotate about the shaft 15 in the other direction. Slipper clutch 13 comprises an inner ring 16 and a coaxial outer ring 17. The inner ring 16 is connected to the shaft 15, while a rod 18 extending through a bore in the shaft 15 prevents a rotation of the inner ring 16 with respect to shaft 15. The outer ring 17 of the slipper clutch 13 is connected to the cord drive wheel 7 through a support member 19, which support member 19 is mounted on shaft 15 so as to be freely rotating. Support member 19 is fixed to the outer ring 17 as well as to drive wheel 7. The slipper clutch 13 is adjusted such that the inner ring 16 can rotate relative to the outer ring 17 in both directions while a predetermined torque is transmitted.

So, when gear 14 is rotating in said first direction (the cord retraction direction), the shaft 15 can rotate freely in the other direction and up to the rotational speed of the gear 14 in said first direction. As long as the rotational speed of gear 14 in the retraction direction is higher than the rotational speed of drive wheel 7, no force is transmitted to the cord. The speed of the drive wheel 7 is determined by the displacement speed of the cord in this manner.

When the gear 14 is rotating in the other direction (the cord paying out direction), the rotational speed of gear 14 being higher than the rotational speed of the drive wheel 7, the slipper clutch 13 will transmit a predetermined torque to the drive wheel 7, causing a pulling force on the cord. The displacement speed of the cord is then determined by the rotational speed of the cord winding reel 1.

Figure 3:
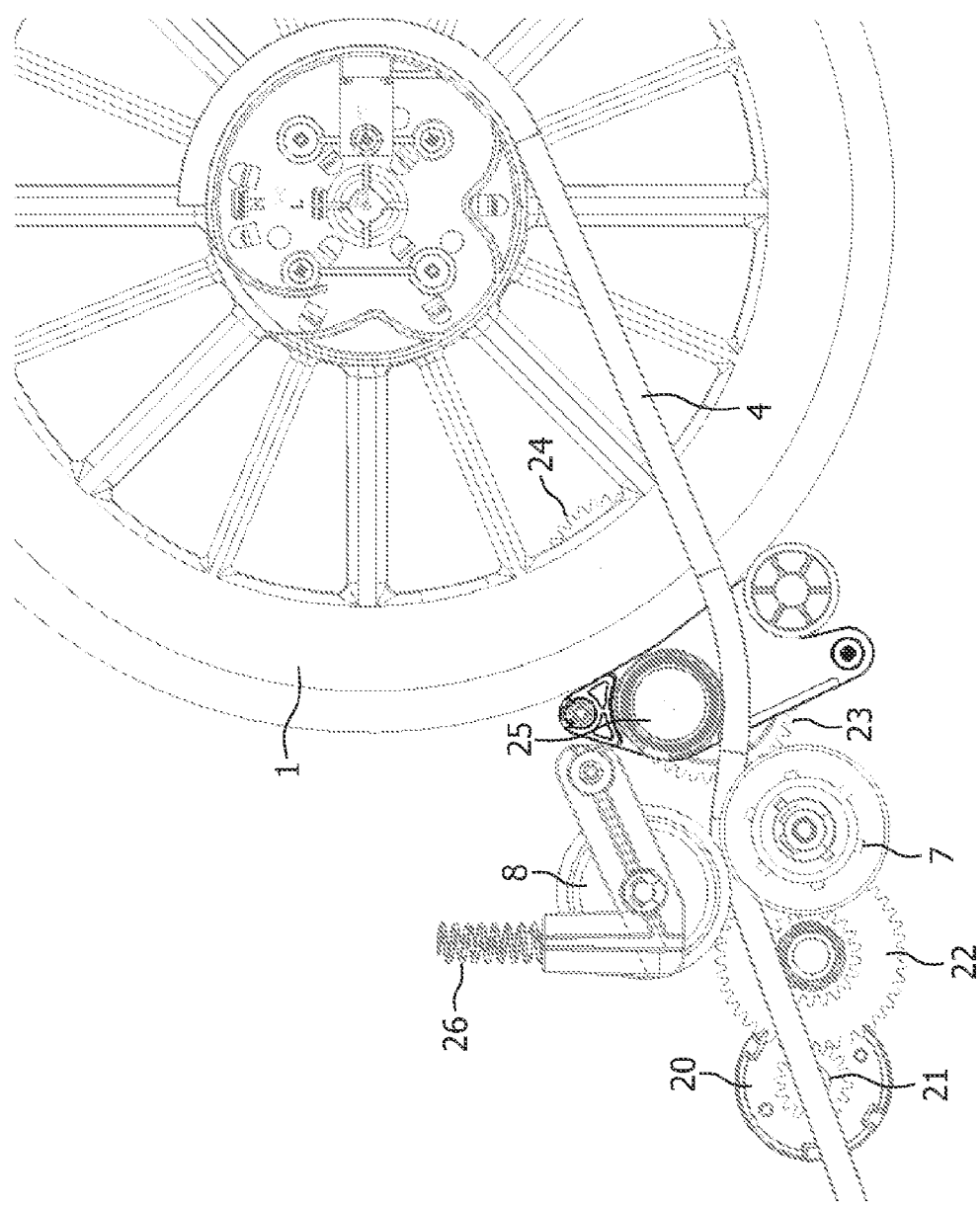
FIG. 3 is a view of parts of the device.
Figure 4:
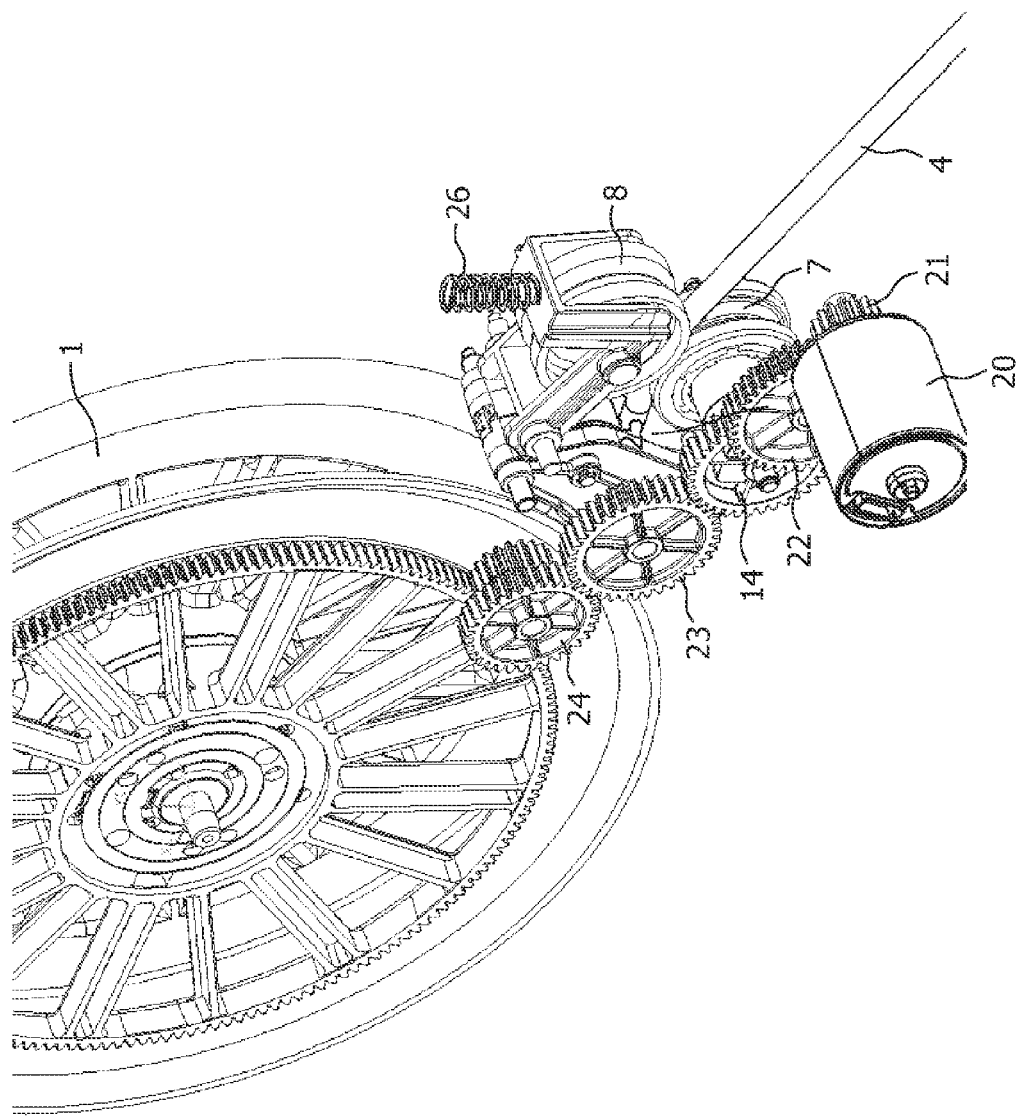
FIG. 4 is a perspective view of these parts.

FIGS. 3 and 4 are different views of the embodiment of the invention described above, only the relevant parts being diagrammatically represented. The electric motor 20 drives the first speed reduction gear 22 via gear 21. The speed reduction gear 22 comprises two coaxial gears of different diameters and is arranged such that the transmitted rotational speed is decreased. The speed reduction gear 22 drives the gear 14 (not shown in FIG. 3) on the shaft of the drive wheel 7 of the cord drive element 7,8. As was elucidated with reference to FIG. 2, a one-way clutch and a slipper clutch are present in the drive line between the gear 14 and the drive wheel 7. The gear 14 drives the speed reduction gear 24 via the intermediate gear 23, which gear 24 then drives the cord winding reel 1.

The rotational speed of the cord winding reel 1 is proportional to the rotational speed of the motor 20. So, controlling the rotational speed of the motor 20 serves to regulate the displacement speed of the cord 4. The speed of the motor 20 is controlled in dependence on the difference between the instantaneous displacement speed of the cord 4 measured by sensor 25 and the desired displacement speed. The sensor comprises a speed detection wheel 25 that is pressed against the cord 4, so that its rotational speed is proportional to the displacement speed of the cord 4. The desired displacement speed of the cord is, for example, equal to the travelling speed of the robotic apparatus in which the device is incorporated.

The cord drive wheel 7 cooperates with the support wheel 8, which support wheel 8 is urged towards the drive wheel 7 by a helical spring 26. The cord 4 will thus be firmly engaged by the drive wheel 7, and furthermore, the pressure will cause some resistance when the cord 4 passes the cord drive element 7, 8, while the one-way clutch allows a free rotation of the drive wheel 7. This resistance ensures that the cord 4 always has some tension between the two cord winder members 7, 8; 1. The level of the pressure exerted by spring 26 may be adjustable.

The gears 21,22,14,23,24 form a so-called gear train, wherein gear 21 has the highest rotational speed and gear 24 has the lowest rotational speed. The use of such a gear train renders it possible to obtain a compact structure for driving both cord winder members by means of the electric motor.

In summary, a device for paying out and retracting an electric power cord 4 comprising two driven cord winder members is disclosed, the first member being a cord winding reel 1 and the second member being a drive element 7, 8 for engaging the cord 4 at a distance from the reel 1. An electric motor 20 can drive one of the two cord winder members in two directions and is connected with driving force to the other cord winder member 7, 8 via a slipper clutch 13 and a one-way clutch 12.

The described embodiment of the invention is merely an example; many other embodiments are possible within the scope of the invention. Further modifications of the disclosed embodiments may be understood from a study of the drawings, the disclosure, and the appended claims and carried into practice by those skilled in the art. In the claims, the word "comprising" or "comprise" does not exclude other elements or steps, and the indefinite article "a" or "an" does not exclude a plurality. Any reference signs in the claims should not be construed as limiting the scope.

The invention claimed is:

1. A device for paying out and retracting an electric power cord, comprising an electric motor and two driven cord winder members, the first cord winder member being a cord winding reel and the second member being a drive element for engaging the cord at a distance from the winding reel, wherein the motor can drive the drive element in two directions, wherein the motor is connected with driving force to the drive element by way of a slipper clutch and a one-way clutch such that said drive element can be driven by the motor in a retraction direction through the slipper clutch while said drive element can be driven by the motor in a payout direction through the one-way clutch and is therefore free to move in the payout direction at a speed lower than the driving speed caused by the motor, the lower speed of the drive element thereby determining the speed of the cord in the payout direction.

2. A device as claimed in claim 1, wherein the motor is connected with driving force to the drive element via the slipper clutch for driving the drive element in the cord paying out direction, the ratio of the rotational speed of the reel to the rotational speed that drives the slipper clutch being such that the slipper clutch is always slipping when unwinding the cord from the reel, and the one-way clutch is present in the connection between the motor (20) and the drive element such that the cord is free to move in the retraction direction at a speed lower than the driving speed caused by the motor.

3. A device as claimed in claim 1, wherein the drive element comprises a drive wheel for engaging the cord and a freely rotating support wheel for urging the cord against the drive wheel.

4. A device as claimed in claim 3, further comprising adjustable means for urging the support wheel against the drive wheel.

5. A device as claimed in claim 1, wherein the motor drives the cord winding reel by means of a gear train comprising at least three consecutive gears, such that the motor is connected to the fastest rotating gear, the cord winding reel is connected to the slowest rotating gear, and the drive element is connected to an intermediate gear.

6. A device as claimed in claim 1, wherein a sensor is present for measuring the paying out speed and the retraction speed of the cord.

7. A device as claimed in claim 6, wherein the sensor comprises a speed detection wheel that is pressed against the cord.

8. A device as claimed in claim 1, wherein the motor is connected with driving force to the winding reel via the slipper clutch for driving the winding reel in the cord paying out direction, the ratio of the rotational speed of the reel to the rotational speed that drives the slipper clutch being such that the slipper clutch is always slipping when unwinding the cord from the reel, and the one-way clutch is present in the connection between the motor and the winding reel such that the cord is free to move in the retraction direction at a speed lower than the driving speed caused by the motor.

9. A method of paying out and retracting an electric power cord, wherein the cord is paid out and retracted by a device comprising an electric motor and two driven cord winder members, the first member being a cord winding reel and the second member being a drive element engaging the cord at a distance from the reel, and wherein the motor drives one of the two cord winder members, the method comprising:

driving, via the motor and slipper clutch, the drive element in a retraction direction, driving, via the motor and one-way clutch, the drive element in a payout direction, wherein the drive element is free to move in the retraction direction at a speed lower than the driving speed caused by the motor.

10. A device for paying out and retracting an electric power cord, comprising an electric motor and two driven cord winder members, the first cord winder member being a cord winding reel and the second member being a drive element for engaging the cord at a distance from the winding reel, wherein the motor can drive the winding reel in two directions, wherein the motor is connected with driving force to the winding reel by way of a slipper clutch -and a one-way clutch such that said winding reel can be driven by the motor in a retraction direction through the slipper clutch while said winding reel can be driven by the motor in a payout direction through the one-way clutch and is therefore free to move in the payout direction at a speed lower than the driving speed caused by the motor, the lower speed of the drive element thereby determining the speed of the cord in the payout direction.

* * * * *